US012473515B2

(12) United States Patent
Reinoso Garcia et al.

(10) Patent No.: US 12,473,515 B2
(45) Date of Patent: Nov. 18, 2025

(54) GRANULES OR POWDERS AND METHODS FOR THEIR MANUFACTURE

(71) Applicant: BASF SE, Ludwigshafen am Rhein (DE)

(72) Inventors: Marta Reinoso Garcia, Ludwigshafen (DE); Juergen Detering, Ludwigshafen (DE); Carsten Sueling, Ludwigshafen (DE); Kati Schmidt, Ludwigshafen (DE); Michael Klemens Mueller, Ludwigshafen (DE); Gazi Tuerkoglu, Ludwigshafen (DE); Thomas Schmidt, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 916 days.

(21) Appl. No.: 17/052,364

(22) PCT Filed: Apr. 25, 2019

(86) PCT No.: PCT/EP2019/060638

§ 371 (c)(1),
(2) Date: Nov. 2, 2020

(87) PCT Pub. No.: WO2019/211170

PCT Pub. Date: Nov. 7, 2019

(65) Prior Publication Data

US 2021/0179978 A1 Jun. 17, 2021

(30) Foreign Application Priority Data

May 4, 2018 (EP) .................................... 18170869

(51) Int. Cl.

| | |
|---|---|
| ***C11D 3/33*** | (2006.01) |
| ***C11D 3/12*** | (2006.01) |
| ***C11D 3/37*** | (2006.01) |
| ***C11D 7/06*** | (2006.01) |
| ***C11D 11/00*** | (2006.01) |
| ***C11D 11/02*** | (2006.01) |
| ***C11D 17/06*** | (2006.01) |

(52) U.S. Cl.
CPC ............ *C11D 11/02* (2013.01); *C11D 3/1246* (2013.01); *C11D 3/33* (2013.01); *C11D 3/3719* (2013.01); *C11D 3/3761* (2013.01); *C11D 3/3769* (2013.01); *C11D 7/06* (2013.01); *C11D 11/0082* (2013.01); *C11D 17/06* (2013.01); *C11D 2111/14* (2024.01)

(58) Field of Classification Search
CPC ............ C11D 3/33; C11D 3/3761; C11D 7/06
USPC ................ 510/230, 444, 445, 480, 499, 477
See application file for complete search history.

(56) References Cited

U.S. PATENT DOCUMENTS

| | | | | |
|---|---|---|---|---|
| 2012/0004147 | A1 | 1/2012 | Seetz et al. | |
| 2017/0058239 | A1 | 3/2017 | Hartmann et al. | |
| 2018/0010072 | A1* | 1/2018 | Letzelter | C11D 3/3769 |
| 2019/0106658 | A1* | 4/2019 | Vasquez Valdivieso | C11D 11/0023 |
| 2019/0119611 | A1 | 4/2019 | Mueller et al. | |
| 2020/0377830 | A1* | 12/2020 | Arlabosse | C11D 17/044 |

FOREIGN PATENT DOCUMENTS

| | | | | |
|---|---|---|---|---|
| CN | 101278038 | A | 10/2008 | |
| CN | 101351539 | A | 1/2009 | |
| CN | 103874756 | A | 6/2014 | |
| CN | 107849495 | A | 3/2018 | |
| DE | 198 19 187 | A1 | 11/1999 | |
| EP | 0 678 572 | A1 | 10/1995 | |
| EP | 0 851 023 | A2 | 7/1998 | |
| EP | 2399981 | A1 * | 12/2011 | C08J 3/126 |
| EP | 3 138 895 | A1 | 3/2017 | |
| JP | 2000290698 | A | 10/2000 | |
| WO | WO 2015/121170 | A1 | 8/2015 | |
| WO | WO 2016/180664 | A1 | 11/2016 | |
| WO | WO 2017/220308 | A1 | 12/2017 | |
| WO | WO 2018/197249 | A1 | 11/2018 | |

OTHER PUBLICATIONS

Extended European Search Report issued on Oct. 16, 2018 in European Patent Application No. 18170869.4, 3 pages.
International Search Report issued May 23, 2019 in PCT/EP2019/060638 filed Apr. 25, 2019.

* cited by examiner

*Primary Examiner* — Gregory R DelCotto
(74) *Attorney, Agent, or Firm* — ArentFox Schiff LLP

(57) ABSTRACT

Process for manufacturing granules or powders comprising the steps of (a) providing an aqueous solution or slurry of (A) at least one chelating agent according to general formula (I a) $[CH_3—CH(COO)—N(CH_2—COO)_2]M_{3-x}H_x$ (I a) wherein M is selected from alkali metal cations and ammonium, same or different, and x is in the range of from 0.01 to 1.0 or (I b) $[OOC—CH_2CH_2—CH(COO)—N(CH_2—COO)_2]M_{4-x}H_x$ (I b) wherein M is as defined above, and x in formula (I b) is in the range of from 0.01 to 2.0, and (B) at least one polymer selected from (B1) polyaspartates with an average molecular weight $M_w$ in the range of from 1,000 to 20,000 g/mole, and (B2) copolymers comprising, in copolymerized form, (α) at least one ester of an ethylenically unsaturated mono- or dicarboxylic acid, and (β) at least one ethylenically unsaturated N-containing monomer, and (b) spray drying or granulating said solution or slurry.

8 Claims, No Drawings

GRANULES OR POWDERS AND METHODS FOR THEIR MANUFACTURE

The present invention relates to a process for manufacturing granules or powders wherein said process comprising the steps of (a) providing an aqueous solution or slurry of (A) at least one chelating agent according to general formula (I a)

$$[CH_3—CH(COO)—N(CH_2—COO)_2]M_{3-x}H_x \quad (I\ a)$$

wherein M is selected from alkali metal cations and ammonium, same or different, and x is in the range of from 0.01 to 1.0, or (I b)

$$[OOC—CH_2CH_2—CH(COO)—N(CH_2—COO)_2]M_{4-x}H_x \quad (I\ b)$$

wherein M is as defined above, and x in formula (I b) is in the range of from 0.01 to 2.0, and (B) at least one polymer selected from (B1) polyaspartates with an average molecular weight $M_w$ in the range of from 1,000 to 20,000 g/mole, and (B2) copolymers comprising, in copolymerized form, (α) at least one ester of an ethylenically unsaturated mono- or dicarboxylic acid, and (β) at least one ethylenically unsaturated N-containing monomer, and (b) spray drying or granulating said solution or slurry.

In addition, the present invention relates to respective powders and granules, and to their use.

Chelating agents of the aminopolycarboxylate type such as methyl glycine diacetic acid (MGDA) and glutamic acid diacetic acid (GLDA) and their respective alkali metal salts are useful sequestrants for alkaline earth metal ions such as $Ca^{2+}$ and $Mg^{2+}$. Various aminopolycarboxylates show good biodegradability and are thus environmentally friendly. For that reason, they are recommended and used for various purposes such as laundry detergents and for automatic dishwashing (ADW) formulations, in particular for so-called phosphate-free laundry detergents and phosphate-free ADW formulations.

Depending on the type of product—liquid home care and fabric care products versus solid home care and fabric care products—and the manufacturing process of solid home care and fabric care products care product manufacturers may either prefer to handle solutions of aminopolycarboxylates or solid aminopolycarboxylates, for example for joint spray drying or solid mixing. Powders and granules of aminopolycarboxylates may be shipped economically due to their high active ingredient content that goes along with low water content. Therefore, convenient processes for providing granules are still of great commercial interest.

However, especially in the presence of bleaching agents on the basis of inorganic peroxides, sometimes shortcomings can be observed. Especially on long-time storage such as several months in summer, yellowing or even formation of brownish stains in the detergent compositions can be observed. Such coloring is commercially unattractive because it may suggest that the quality of the respective detergent composition may have deteriorated.

One method to achieve an improved stability is a co-granulation with polymers such as polyacrylic acid, see, e.g., WO 2015/121170.

However, it has been found that in particular cases, such co-granulation or co-spraying may lead to colorization of the resultant powders or granules. In other cases, such co-granulation or co-spraying may lead to deterioration of the builder properties.

It was an objective of the present invention to provide a solid builder component for cleaning formulations that avoids the above shortcomings. It was further an objective to provide a process for making a solid builder component for cleaning formulations that avoid the above short-comings. It was further an objective to provide applications.

Accordingly, the process and granules and powders defined at the outset have been found, hereinafter also referred to as inventive process and inventive granules and inventive powders, respectively.

The term "granule" in the context of the present invention refers to particulate materials that are solids at ambient temperature and that preferably have an average particle diameter (D50) in the range of from 0.1 mm to 2 mm, preferably 0.4 mm to 1.25 mm, even more preferably 400 μm to 1 mm. The average particle diameter of inventive granules can be determined, e.g., by optical or preferably by sieving methods. Sieves employed may have a mesh in the range of from 60 to 3,000 μm.

The term "powders" in the context of the present invention refers to particulate materials and that preferably have an average particle diameter in the range of from 1 μm to less than 0.1 mm, preferably 100 μm up to 750 μm. The average particle diameter of inventive powders can be determined, e.g., by LASER diffraction methods, for example with Malvern apparatus, and refers to the volume average. Inventive granules are particulate materials that are solids at ambient temperature and that preferably have an average particle diameter in the range of from 0.1 mm to 2 mm, preferably 0.75 mm to 1.25 mm. The average particle diameter of inventive granules can be determined, e.g., by optical or preferably by sieving methods. Sieves employed may have a mesh in the range of from 60 to 1,250 μm.

The inventive process comprises two steps, step (a) and step (b).

Step (a) includes providing an aqueous solution or aqueous slurry of a chelating agent (A), namely, at least one chelating agent according to general formula (I a)

$$[CH_3—CH(COO)—N(CH_2—COO)_2]M_{3-x}H_x \quad (I\ a)$$

wherein M is selected from ammonium and alkali metal cations, same or different, for example cations of lithium, sodium, potassium, rubidium, cesium, and combinations of at least two of the foregoing. Ammonium may be substituted with alkyl but non-substituted ammonium $NH_4^+$ is preferred. Preferred examples of alkali metal cations are sodium and potassium and combinations of sodium and potassium, and even more preferred in compound according to general formula (I a) all M are the same and they are all Na;

and x in formula (I a) is in the range of from 0.01 to 1.0, preferably 0.015 to 0.2, or (I b)

$$[OOC—CH_2CH_2—CH(COO)—N(CH_2—COO)_2]M_{4-x}H_x \quad (I\ b)$$

wherein M is as defined above, and x in formula (I b) is in the range of from 0.01 to 2.0, preferably 0.015 to 1.0.

In one embodiment of the present invention, said aqueous solution or slurry contains a combination of at least two of the foregoing, for example a combination of chelating agent according to general formula (I a) and a chelating agent according to general formula (I b).

Chelating agents according to the general formula (I a) are preferred.

Most preferably in compound according to general formula (I b) all M are the same and they are all Na.

In one embodiment of the present invention, compound according to general formula (I a) is selected from at least one ammonium or alkali metal salt of racemic MGDA and from ammonium and alkali metal salts of mixtures of L- and D-enantiomers according to formula (I), said mixture containing predominantly the respective L-isomer with an enantiomeric excess (ee) in the range of from 5 to 99%, preferably 5 to 95%, more preferably from 10 to 75% and even more preferably from 10 to 66%.

In one embodiment of the present invention, compound according to general formula (I b) is selected from at least one alkali metal salt of a mixture of L- and D-enantiomers according to formula (I b), said mixture containing the racemic mixture or preferably predominantly the respective L-isomer, for example with an enantiomeric excess (ee) in the range of from 5 to 99%, preferably 15 to 95%.

The enantiomeric excess of compound according to general formula (I a) may be determined by measuring the polarization (polarimetry) or preferably by chromatography, for example by HPLC with a chiral column, for example with one or more cyclodextrins as immobilized phase or with a ligand exchange (Pirkle-brush) concept chiral stationary phase. Preferred is determination of the ee by HPLC with an immobilized optically active amine such as D-penicillamine in the presence of copper(II) salt. The enantiomeric excess of compound according to general formula (I b) salts may be determined by measuring the polarization (polarimetry).

In one embodiment of the present invention, compound according to general formulae (I a) or (I b) may contain one or more impurities that may result from the synthesis of the respective chelating agents (A). Such impurities may be propionic acid, lactic acid, glutamate, alanine, nitrilotriacetic acid (NTA) or the like and their respective alkali metal salts. Such impurities are usually present in minor amounts. "Minor amounts" in this context refer to a total of 0.1 to 5% by weight, referring to alkali metal salt of compound according to general formulae (I a) or (I b), respectively, preferably up to 2.5% by weight.

In one embodiment of the present invention, chelating agent (A) may contain in the range of from 0.1 to 10% by weight of one or more optically inactive impurities, at least one of the impurities being selected from iminodiacetic acid, formic acid, glycolic acid, propionic acid, acetic acid and their respective alkali metal or mono-, di- or triammonium salts. In one embodiment of the present invention, inventive mixtures may contain less than 0.2% by weight of nitrilotriacetic acid (NTA), preferably 0.01 to 0.1% by weight. The percentages refer to total chelating agents (A).

In one embodiment of the present invention, chelating agent (A) may contain in the range of from 0.1 to 10% by weight of one or more optically active impurities, at least one of the impurities being selected from L-carboxymethylalanine and its respective mono- or dialkali metal salts, L-carboxymethylglutamic acid and its respective di- or trialkali metal salts, and optically active mono- or diamides that result from an incomplete saponification during the synthesis of chelating agents (A). Preferably, the amount of optically active impurities is in the range of from 0.2 to 10% by weight, referring to the sum of chelating agents (A). Even more preferably, the amount of optically active impurities is in the range of from 1 to 7% by weight.

In one embodiment of the present invention, chelating agent (A) may contain minor amounts of cations other than alkali metal or ammonium. It is thus possible that minor amounts, such as 0.01 to 5 mol-% of total chelating agent, based on anion, bear alkali earth metal cations such as $Mg^{2+}$ or $Ca^{2+}$, or transition metal ions such as $Fe^{2+}$ or $Fe^{3+}$ cations.

Chelating agent (A) may be provided as aqueous solution or as aqueous slurry, altogether also referred to as aqueous medium.

The manufacture of chelating agents (A) is known per se. Chelating agents according to general formula (I a) may be synthesized, for example, in accordance with WO 2016/180664.

In one embodiment of the present invention, said aqueous slurry or solution provided in step (a) has a concentration of chelating agent (A) in the range of from 30 to 65% by weight.

In one embodiment of the present invention, wherein polymer (B) is selected from polyaspartates (B1), said aqueous medium contains in the range of from 2 to 50% by weight of chelating agent (A), preferably 5 to 45% by weight, more preferably 10 to 40% by weight.

In one embodiment of the present invention, wherein polymer (B) is selected from copolymers (B2), said aqueous medium contains in the range of from 30 to 75% by weight of chelating agent (A), preferably 35 to 70% by weight, more preferably 40 to 60% by weight.

Aqueous medium refers to media in which the solvent is essentially water. In one embodiment, in such aqueous medium water is the sole solvent. In other embodiments, mixtures of water with one or more water-miscible solvents are used as aqueous medium. The term water-miscible solvent refers to organic solvents that are miscible with water at ambient temperature without phase-separation. Examples are ethylene glycol, 1,2-propylene glycol, isopropanol, and diethylene glycol. Preferably, at least 50% by volume of the respective aqueous medium is water, referring to the solvent.

In one embodiment of the present invention, the aqueous medium containing chelating agent (A) contains at least one inorganic basic salt selected from alkali metal (hydrogen) carbonates. Preferred examples are sodium carbonate, potassium carbonate, potassium bicarbonate, and sodium bicarbonate, for example 0.1 to 1.5% by weight, especially sodium carbonate.

In one embodiment of the present invention, chelating agent (A) contains one or more by-products resulting from incomplete saponification of the respective intermediate from the synthesis of chelating agent (A). Such incomplete saponification may result, e.g., in the formation of amido groups instead of carboxylate groups in chelating agent according to general formula (I a) or (I b).

Aqueous slurry or aqueous solution provided in step (a) further comprises at least one polymer (B) Said polymer (B) is selected from (B1) polyaspartates with an average molecular weight $M_w$ in the range of from 1,000 to 20,000 g/mole, and (B2) copolymers comprising, in copolymerized form,

- (α) at least one ester of an ethylenically unsaturated mono- or dicarboxylic acid, hereinafter also referred to as comonomer (α), and
- (β) at least one ethylenically unsaturated N-containing monomer, hereinafter also referred to as comonomer (β). Preferred comonomers (β) are ethylenically unsaturated N-containing monomer with a so-called permanent cationic charge, that are comonomers that are cationic independently of the pH value.

Polymer (B2) may also be referred to as copolymer (B2).

In one embodiment of the present invention, polyaspartates (B1) are used as salts, partially or fully neutralized, of polyaspartic acid, preferably as alkali metal salts, for example as sodium or potassium salts or combinations of sodium and potassium salts, and even more preferred as sodium salts.

Three main methods have been developed for the production of polyaspartates (B1) and especially their alkali metal salts:

(1) Thermal polycondensation of aspartic acid followed by alkaline hydrolysis of the intermediate polysuccinimide;

(2) Thermal polycondensation of aspartic acid in the presence of an acid catalyst such as phosphoric acid, sulfuric acid or methanesulfonic acid followed by alkaline hydrolysis of the intermediate polysuccinimide;

(3) Polymerization of maleic acid anhydride in the presence of ammonia or ammonium salts followed by alkaline hydrolysis of the intermediate polysuccinimide.

Regardless of the synthesis route, the intermediate polysuccinimide is hydrolyzed by means of e.g. alkali metal hydroxide in order to obtain an aqueous polyaspartate solution. Acidification of the polyaspartate solution with mineral acids such as hydrochloric acid or sulfur acid may yield the free polyaspartic acid.

The preferred molecular weight $M_w$ of polyaspartate (B1) used according to the present invention is in the range of from 1,000 g/mol to 20,000 g/mol, preferably from 1,500 to 15,000 g/mol and particularly preferably from 2,000 to 10,000 g/mol. The molecular weight of polyaspartates (B1) is preferably determined as sodium salt, fully neutralized. The molecular weight of polyaspartates (B1) is preferably determined by gel permeation chromatography (GPC) in a 0.08 mol/l TRIS buffer at a pH value of 7.0, additionally containing 0.15 M NaCl and 0.07 M $NaN_3$. TRIS refers to tris(hydroxylmethyl)aminomethane.

Polyaspartate (B1) may be based upon L- or D- or D,L-aspartic acid or partially racemized L-aspartic acid. Preference is given to using L-aspartic acid.

Copolymer (B2) is described in more detail below. Copolymer (B2) contains, in copolymerized form, at least one comonomer (α) and at least one comonomer (β).

Examples of comonomers (α) are esters of (meth)acrylic acid, for example $$CH_2{=}C(R^1)—CO—O—R^2$$

wherein $R^1$ is from hydrogen and methyl, and $R^2$ is selected from $C_1$-$C_4$-alkyl, for example methyl, ethyl, n-propyl, isopropyl, n-butyl, isobutyl, sec.-butyl, and tert.-butyl, and combinations of at least two of the foregoing, preferred are methyl and ethyl and combinations thereof, and even more preferred $C_1$-$C_4$-alkyl is methyl, 2-hydroxyethyl and 3-hydroxypropyl, and $(AO)_yH$ or $(AO)_y$-$C_1$-$C_4$-alkyl with y being in the range of from 1 to 100 and AO is selected from $C_2$-$C_4$-alkylene oxides, identical or different, preferably selected from $CH_2—CH_2—O$, $(CH_2)_3—O$, $(CH_2)_4—O$, $CH_2CH(CH_3)—O$, $CH(CH_3)—CH_2—O—$ and $CH_2CH(n\text{-}C_3H_7)—O$. Most preferred example of AO is $CH_2—CH_2—O$ ("EO").

A preferred combination of ethylene oxide and propylene oxide is PO-$(EO)_{y-1}$.

The variable y is in the range of from 1 to 100, preferably 3 to 70, more preferably 5 to 50. The variable y is to be understood as average number, preferably as number average.

Preferred examples are methyl (meth)acrylate, ethyl (meth)acrylate, and 2-hydroxyethyl(meth)acrylate.

In one embodiment of the present invention, copolymer (B2) comprises a combination of at least two of the foregoing comonomers.

Examples of comonomers (β) are monomers bearing an amide group, a dialkylamino group, a trialkylammonium group, a pyridinium group, a pyrrolidinium group, an imidazolinium group, and di-$C_1$-$C_4$-alkyl-diallyl compounds.

Preferred are compounds of the following formulae (β.1) to (β.5)

(β.1)

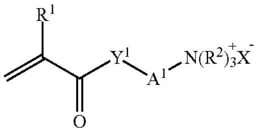

wherein $R^1$ is hydrogen or methyl $Y^1$ is oxygen or N—H, $A^1$ is selected from $C_2$-$C_4$-alkylene, for example $—CH_2—CH_2—$, $—(CH_2)_3—$ or $—(CH_2)_4—$. Preferred are $CH_2—CH_2—$ and $—(CH_2)_3—$.

$R^2$ are different or preferably the same and selected from benzyl and n-$C_1$-$C_4$-alkyl, for example methyl, ethyl, n-propyl, or n-butyl, preferably they are the same and all methyl.

$X^-$ is selected from halide, for example iodide, bromide and in particular chloride, also from mono-$C_1$-$C_4$-alkyl sulfate and sulfate. Examples of mono-$C_1$-$C_4$-alkyl sulfate are methyl sulfate, ethyl sulfate, isopropyl sulfate and n-butyl sulfate, preferably methyl sulfate and ethyl sulfate. If $X^-$ is selected as sulfate, then $X^-$ is a half equivalent of sulfate.

(β.2)

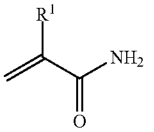

In comonomers according to general formula (β.2), $R^1$ is selected from hydrogen and methyl.

(β.3)

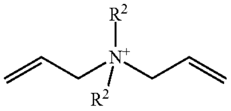

In comonomers according to general formula (β.3), $R^2$ are different or preferably the same and selected from n-$C_1$-$C_4$-alkyl, preferably they are the same and both methyl.

(β.4)

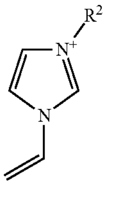

-continued (β.5)

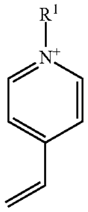

In comonomers according to general formulae (β.4) and (β.5), $R^1$ and $R^2$ are defined as above, or they are benzyl. Possible counterions are halide, for example chloride, and methylsulfate.

A further preferred example of comonomer (β) are N-vinyl-amides, for example N-vinylformamide, N-vinyl-N-methylformamide, N-vinyl-N-methylacetamide, N-vinylacetamide, N-vinyl pyrrolidone ("NVP"), N-vinylcaprolactam, and N-vinylpiperidone.

In one embodiment of the present invention, copolymer (B2) comprises a combination of at least two of the foregoing comonomers (β) in copolymerized form.

Preferred comonomers (β) are selected from those with a permanent cationic charge. Particularly preferred are the comonomers below.

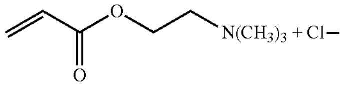

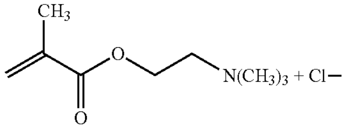

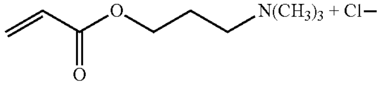

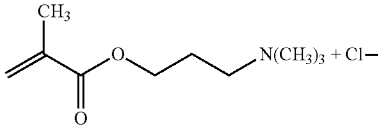

Copolymer (B2) may contain one or more additional comonomers (γ), for example (meth)acrylic acid or its respective alkali metal salts, styrene, methylvinylether, ethylvinyl ether, vinyl acetate, vinyl propionate, allyl acetate, vinyl n-butyrate, and vinyl 2-ethylhexanoate.

In one embodiment of the present invention, copolymer (B2) comprises comonomer(s) (α) and comonomer(s) (β) in a weight ratio in the range of from 50:1 to 1:4, preferably 10:1 to 1:3.5.

In embodiments of copolymer (B2) wherein one or more comonomers (γ) are present in copolymerized form, the weight ratio of (γ)/[(α)+(β)] is in the range of from 1:1000 to 1:10.

Comonomers (α) and (β) may be arranged in copolymer (B2) in any way, for example statistically, block-wise, or polymer (B2) may be a graft copolymer. In a preferred embodiment, copolymers (B2) are random copolymers.

In one embodiment of the present invention, copolymer (B2) has an average molecular weight $M_w$ in the range of from 2,000 to 200,000 g/mole, preferably 3,000 to 175,000 g/mole and preferably 5,000 to 150,000 g/mole. The average molecular weight $M_w$ as well as $M_n$ may be determined by Size Exclusion Chromatography ("SEC") in 0.1% by weight trifluoracetic acid in distilled water. For calibration, poly(2-vinylpyridine) standard may be used, PSS (Germany).

In one embodiment of the present invention, polymer (B) has a polydispersity $M_w/M_n$ in the range of from 1.1 to 6.0, preferably 1.3 to 4.5, even more preferred 1.5 to 3.5.

For the naked eye, solutions provided in step (a) such as aqueous solutions do not contain precipitates. Aqueous solutions in the context of the present invention may contain some organic solvent, for example 0.1 to 20% by volume, referring to the entire continuous phase. In a preferred embodiment, aqueous solutions do not contain significant amounts of organic solvent. Slurries provided in step (a) contain precipitates.

The liquid phase of solutions provided in step (a) may also comprise one or more inorganic salts dissolved in the liquid phase, for example alkali metal bicarbonate, alkali metal sulfate or alkali metal halide or a combination of at least two of the foregoing.

In one embodiment of the present invention, such aqueous solution or aqueous slurries according to step (a) has a pH value in the range of from 8 to 11, preferably 9 to 10. The pH value is determined at ambient temperature.

The aqueous slurry or aqueous solution according to step (a) may have a temperature in the range of from 15 to 95° C., preferably 20 to 90° C. and even more preferably 50 to 90° C.

In one embodiment of the present invention, the weight ratio of chelating agent(s) (A) to polymer (B) is in the range of 100:1 to 1:10.

Preferably, the weight ratio of chelating agent(s) (A) to polyaspartate (B1) is in the range of 40:1 to 1:10, preferably 20:1 to 1:8, more preferably 10:1 to 1:5 and even more preferably 4:1 to 1:4.

Preferably, the weight ratio of chelating agent(s) (A) to copolymer (B2) is in the range of from 100:1 to 10:1, even more preferably from 75:1 to 20:1.

In step (b) of the inventive process, the slurry or—preferably—the aqueous solution obtained from step (a) is spray granulated, for example with a gas inlet temperature of at least 120° C., or it is spray-dried.

Spray-drying may be preferred in a spray dryer, for example a spray chamber or a spray tower. A solution or slurry according to step (a) with a temperature preferably higher than ambient temperature, for example in the range of from 50 to 95° C., is introduced into the spray dryer through one or more spray nozzles into a hot gas inlet stream, for example nitrogen or air, the solution or slurry being converted into droplets and the water being vaporized. The hot gas inlet stream may have a temperature in the range of from 125 to 350° C.

The second spray dryer is charged with a fluidized bed with solid from the first spray dryer and solution or slurry obtained according to the above step is sprayed onto or into the fluidized bed, together with a hot gas inlet stream. The hot gas inlet stream may have a temperature in the range of from 125 to 350° C., preferably 160 to 220° C.

In another embodiment, especially in a process for making an inventive powder, the average residence time of chelating agent (A) and polymer (B), in step (b) is in the range of from 1 second to 1 minute, especially 2 to 20 seconds.

Spray-granulation may be performed in a fluidized bed or a spouted bed.

In the course of step (b), said aqueous slurry or aqueous solution is introduced into a spray tower or spray granulator.

A spray granulator usually contains a fluidized bed, in the context of the present invention it is a fluidized bed of chelating agent (A), preferably in its crystalline or at least partially crystalline state. In one embodiment of the present invention, the fluidized bed may have a temperature in the range of from 80 to 150° C., preferably 85 to 110° C.

Spraying is being performed through one or more nozzles per spray tower or spray granulator. Suitable nozzles are, for example, high-pressure rotary drum atomizers, rotary atomizers, three-fluid nozzles, single-fluid nozzles and two-fluid nozzles, single-fluid nozzles and two-fluid nozzles being preferred. The first fluid is the aqueous slurry or aqueous solution, respectively, the second fluid is compressed hot gas, also referred to as hot gas inlet stream, for example with a pressure of 1.1 to 7 bar. The hot gas inlet stream may have a temperature in the range of from at least 125° C. to 250° C., preferably 150 to 250° C., even more preferably 160 to 220° C.

In the course of step (b), said aqueous slurry or aqueous solution is introduced in the form of droplets. In one embodiment of the present invention, the droplets formed during the spray-granulating or spray-drying have an average diameter in the range of from 10 to 500 μm, preferably from 20 to 180 μm, even more preferably from 30 to 100 μm.

In one embodiment of the present invention, the off-gas departing the spray tower or spray granulator, respectively, may have a temperature in the range of from 40 to 140° C., preferably 80 to 110° C. but in any way colder than the hot gas stream. Preferably, the temperature of the off-gas departing the drying vessel and the temperature of the solid product present in the drying vessel are identical.

In one embodiment of the present invention, the pressure in the spray tower or spray granulator in step (b) is normal pressure±100 mbar, preferably normal pressure±20 mbar, for example one mbar less than normal pressure.

In one embodiment of the present invention, especially in a process for making an inventive granule, the average residence time of chelating agent (A) in step (b) is in the range of from 2 minutes to 4 hours, preferably from 30 minutes to 2 hours.

In another embodiment of the present invention, spray-granulation is being performed by performing two or more consecutive spray-drying processes, for example in a cascade of at least two spray dryers, for example in a cascade of at least two consecutive spray towers or a combination of a spray tower and a spray chamber, said spray chamber containing a fluidized bed. In the first dryer, a spray-drying process is being performed in the way as follows.

Spray-drying may be preferred in a spray dryer, for example a spray chamber or a spray tower. An aqueous slurry or solution with a temperature preferably higher than ambient temperature, for example in the range of from 50 to 95° C. is introduced into the spray dryer through one or more spray nozzles into a hot gas inlet stream, for example nitrogen or air, the solution or slurry being converted into droplets and the water being vaporized. The hot gas inlet stream may have a temperature in the range of from 125 to 350° C. The second spray dryer is charged with a fluidized bed with solid from the first spray dryer and solution or slurry obtained according to the above step is sprayed onto or into the fluidized bed, together with a hot gas inlet stream. The hot gas inlet stream may have a temperature in the range of from 125 to 350° C., preferably 160 to 220° C.

In embodiments wherein an aged slurry is used, such aging may take in the range of from 2 hours to 24 hours at the temperature preferably higher than ambient temperature.

In the course of step (a), most of the water is removed. Most of the water shall mean that a residual moisture content of 0.1 to 20% by weight, referring to the powder or granule, remains. in embodiments that start of from a solution, about 51 to 75% by weight of the water present in the aqueous solution is removed in step (a).

In one embodiment of the present invention, the pressure in the drying vessel in step (b) is normal pressure±100 mbar, preferably normal pressure±20 mbar, for example one mbar less than normal pressure.

In embodiments wherein an aged solution is used, such aging may take in the range of from 2 hours to 24 hours at the temperature preferably higher than ambient temperature.

In the course of step (b), most of the water of the aqueous solution or slurry provided in step (a) is removed. Most of the water shall mean that a residual moisture content preferably of 5 to 15% by weight, referring to the granule, remains. Preferably, about 51 to 75% by weight of the water present in the aqueous solution is removed in step (b).

In some embodiments of the present invention, the inventive process may comprise one or more additional steps. Such additional step(s) may be performed between step (a) and step (b) or during step (b) or after step (b). Examples of such additional steps are sieving and post-drying steps, sometimes also referred to as thermal after-treatment, preferably after step (b). Thermal after-treatment may be performed in a drying oven, for example at a temperature in the range from 80 to 120° C., or with hot steam, preferably at 100 to 160° C. Other—optional—steps are pre-concentration steps between step (a) and step (b).

Examples of additional optional steps during step (b) are removal of fines, removal of particles that are too big, so called "overs", recycling of fines, and milling down and recycling of such milled down overs.

For example, fines may be defined as particles with a maximum diameter of 150 μm or less and generated during step (b), for example 1 to 150 μm. So-called overs or lumps may have a minimum diameter of 1 mm or more, for example 1 mm up to 5 mm. Such lumps may be removed from the spray granulator and milled down to a maximum particle diameter of 500 μm, preferably to a maximum particle diameter of 400 μm. The milling may be performed in any type of mills. Examples of particularly useful mills are jet mills, pin mills and bolting machines (German: Stiftmühlen). Further examples are roller mills and ball mills. After that, the fines and the milled down lumps are returned into the spray granulator.

In one embodiment of the present invention, a share of 1 to 15% of fines and 1 to 40% of milled down lumps are returned into the granulator, percentages referring to the overall granule.

By performing the inventive process, granules or powders are obtained that exhibit excellent performance properties, especially with respect to yellowing, for example to percarbonate stability and tablet stability. In particular, such granule or powder shows a low tendency of yellowing or even forming brownish specks.

Without wishing to be bound by any theory we assume that strongly basic solutions of MGDA or GLDA may lead to a deterioration of polymer (B).

In one embodiment of the present invention, one or more additives (C) can be added to the solution obtained according to step (a) before performing step (b), or one or more of such additives (C) can be added at any stage during step (a). Examples of useful additives (C) are, for example, titanium dioxide, sugar, silica gel and polyvinyl alcohol. Polyvinyl alcohol in the context of the present invention refers to completely or partially hydrolyzed polyvinyl acetate. In partially hydrolyzed polyvinyl acetate, at least 95 mol-%, preferably at least 96 mol-% of the acetate groups have been hydrolyzed.

In one embodiment of the present invention polyvinyl alcohol has an average molecular weight $M_w$ in the range of from 22,500 to 115,000 g/mol, for example up to 40,000 g/mol.

In one embodiment of the present invention polyvinyl alcohol has an average molecular weight $M_n$ in the range of from 2,000 to 40,000 g/mol.

Additive(s) (C) can amount to 0.1 to 5% by weight, referring to the sum of chelating agent (A) and polymer (B).

Preferably, no additive (C) is being employed in step (b).

One or more additional steps (c) may be performed at any stage of the inventive proves, preferably after step (b). It is thus possible to perform a sieving step (c) to remove lumps from the powder or granule. Also, a post-drying step (c) is possible. Air classifying can be performed during or after step (b) to remove fines.

Fines, especially those with a diameter of less than 50 μm, may deteriorate the flowing behavior of powders or granules obtained according to the inventive process. However, amorphous or preferably crystalline fines may be returned to the spray vessel(s) as seed for crystallization.

Lumps may be removed and either re-dissolved in water or milled and used as seed for crystallization in the spray vessel(s).

A further aspect of the present invention is directed to powders and to granules, hereinafter also referred to as inventive powders and inventive granules, respectively. Inventive granules and inventive powders contain (A) at least one chelating agent according to general formula (I a)

$$[CH_3—CH(COO)—N(CH_2—COO)_2]M_{3-x}H_x \quad \text{(I a)}$$

wherein M is selected from alkali metal cations and ammonium, same or different, for example cations of lithium, sodium, potassium, rubidium, cesium, and combinations of at least two of the foregoing. Ammonium may be substituted with alkyl but non-substituted ammonium $NH_4^+$ is preferred. Preferred examples of alkali metal cations are sodium and potassium and combinations of sodium and potassium, and even more preferred in compound according to general formula (I a) all M are the same and they are all Na.

The variable x in formula (I a) is in the range of from 0.01 to 1.0, preferably 0.015 to 0.2.

In another embodiment of the present invention, inventive granules or powders contain a chelating agent according to general formula (I b)

$$[OOC—CH_2CH_2—CH(COO)—N(CH_2—COO)_2]M_{4-x}H_x \quad \text{(I b)}$$

wherein M is as defined above, and x in formula (I b) is in the range of from 0.01 to 2.0, preferably 0.015 to 1.0.

In one embodiment of the present invention, inventive granules or powders contain a combination of at least two of the foregoing, for example a combination of chelating agent according to general formula (I a) and a chelating agent according to general formula (I b).

Chelating agents according to the general formula (I a) are preferred.

In one embodiment of the present invention, minor amounts of chelating agent (A) may bear a cation other than alkali metal. It is thus possible that minor amounts, such as 0.01 to 5 mol-% of total chelating agent (A) bear alkali earth metal cations such as $Mg^{2+}$ or $Ca^{2+}$, or an $Fe^{2+}$ or $Fe^{3+}$ cation.

In one embodiment of the present invention, chelating agent (A) may contain one or more impurities that may result from the production of the respective chelating agent. In the case of MGDA and its alkali metal salts, such impurities may be selected from alkali metal propionate, lactic acid, alanine or the like. Such impurities are usually present in minor amounts. "Minor amounts" in this context refer to a total of 0.1 to 1% by weight, referring to chelating agent (A). In the context of the present invention, such minor amounts are neglected when determining the composition of inventive powder or inventive granule, respectively.

In one embodiment of the present invention, chelating agent (A) contains one or more by-products resulting from incomplete saponification of the respective intermediate from the synthesis of chelating agent (A). Such incomplete saponification may result, e.g., in the formation of amido groups instead of carboxylate groups in chelating agent according to general formula (I a) or (I b).

In addition, inventive granules or powders contain (B) at least one polymer selected from (B1) polyaspartates with an average molecular weight $M_w$ in the range of from 1,000 to 20,000 g/mole, and (B2) copolymers comprising, in copolymerized form, (α) at least one ester of an ethylenically unsaturated mono- or dicarboxylic acid, and (β) at least one ethylenically unsaturated N-containing monomer.

In one embodiment of the present invention, polyaspartates (B1) are used as salts, partially or fully neutralized, of polyaspartic acid, preferably as alkali metal salts, for example as sodium or potassium salts or combinations of sodium and potassium salts, and even more preferred as sodium salts.

The preferred molecular weight of polyaspartate (B1) used according to the present invention is in the range of from 1,000 g/mol to 20,000 g/mol, preferably from 1,500 to 15,000 g/mol and particularly preferably from 2,000 to 10,000 g/mol. The molecular weight of polyaspartate (B1) is preferably determined as sodium salt, fully neutralized. The molecular weight of polyaspartate (B1) is preferably determined by gel permeation chromatography (GPC) in a 0.08 mol/I TRIS buffer at a pH value of 7.0, additionally containing 0.15 M NaCl and 0.07 M $NaN_3$. TRIS refers to tris(hydroylmethyl)aminomethane.

Polyaspartate (B1) can be based upon L- or D- or D,L-aspartic acid or partially racemized L-aspartic acid. Preference is given to using L-aspartic acid.

Copolymer (B2) is described in more detail below. Copolymer (B2) contains, in copolymerized form, at least one comonomer (α) and at least one comonomer (δ).

Examples of comonomers (α) are esters of (meth)acrylic acid, for example $$CH_2═C(R^1)—CO—O—R^2$$

wherein $R^1$ is from hydrogen and methyl, and $R^2$ is selected from $C_1$-$C_4$-alkyl, for example methyl, ethyl, n-propyl, isopropyl, n-butyl, isobutyl, sec.-butyl, and tert.-butyl, and combinations of at least two of the foregoing, preferred are methyl and ethyl and combinations thereof, and even more preferred $C_1$-$C_4$-alkyl is methyl, 2-hydroxyethyl and 3-hydroxypropyl, and $(AO)_yH$ or $(AO)_y$-$C_1$-$C_4$-alkyl with y being in the range of from 1 to 100 and AO is selected from $C_2$-$C_4$-alkylene oxides, identical or different, preferably selected from $CH_2—CH_2—O$, $(CH_2)_3—O$, $(CH_2)_4—O$, $CH_2CH(CH_3)—$ O, $CH(CH_3)—CH_2—O—$ and $CH_2CH(n\text{-}C_3H_7)—O$. Most preferred example of AO is $CH_2—CH_2—O$ ("EO").

A preferred combination of ethylene oxide and propylene oxide is $PO\text{-}(EO)_{y\text{-}1}$.

The variable y is in the range of from 1 to 100, preferably 3 to 70, more preferably 5 to 50. The variable y is to be understood as average number, preferably as number average.

Preferred examples are methyl (meth)acrylate, ethyl (meth)acrylate, and 2-hydroxyethyl(meth)acrylate.

In one embodiment of the present invention, polymer (B) comprises a combination of at least two of the foregoing comonomers.

Preferred comonomers (β) are ethylenically unsaturated N-containing monomer with a so-called permanent cationic charge, that are comonomers that are cationic independently of the pH value.

Examples of comonomers (β) are monomers bearing an amide group, a dialkylamino group, a trialkylammonium group, a pyridinium group, a pyrrolidinium group, an imidazolinium group, and di-$C_1$-$C_4$-alkyl-diallyl compounds.

Preferred are compounds of the following formulae (β.1) to (β.5)

(β.1)

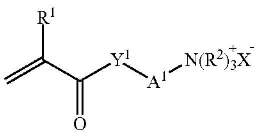

wherein $R^1$ is hydrogen or methyl $Y^1$ is oxygen or N—H, $A^1$ is selected from $C_2$-$C_4$-alkylene, for example $—CH_2—CH_2—$, $—(CH_2)_3—$ or $—(CH_2)_4—$. Preferred are $CH_2—CH_2—$ and $—(CH_2)_3—$.

$R^2$ are different or preferably the same and selected from benzyl and n-$C_1$-$C_4$-alkyl, for example methyl, ethyl, n-propyl, or n-butyl, preferably they are the same and all methyl.

$X^-$ is selected from halide, for example iodide, bromide and in particular chloride, also from mono-$C_1$-$C_4$-alkyl sulfate and sulfate. Examples of mono-$C_1$-$C_4$-alkyl sulfate are methyl sulfate, ethyl sulfate, isopropyl sulfate and n-butyl sulfate, preferably methyl sulfate and ethyl sulfate. If $X^-$ is selected as sulfate, then $X^-$ is a half equivalent of sulfate.

(β.2)

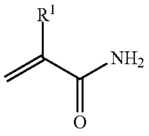

In comonomers according to general formula (β.2), $R^1$ is selected from hydrogen and methyl.

(β.3)

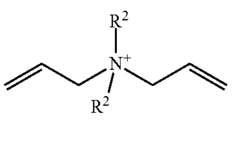

In comonomers according to general formula (II c), $R^2$ are different or preferably the same and selected from n-$C_1$-$C_4$-alkyl, preferably they are the same and both methyl.

(β.4)

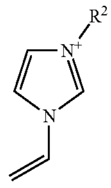

(β.5)

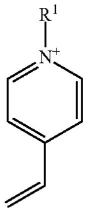

In comonomers according to general formulae (β.4) and (β.5), $R^1$ and $R^2$ are defined as above, or they are benzyl. Possible counterions are halide, for example chloride, and methylsulfate Further preferred examples of comonomer (β) are N-vinyl-amides, for example N-vinylformamide, N-vinyl-N-methylformamide, N-vinyl-N-methylacetamide, N-vinylacetamide, N-vinyl pyrrolidone ("NVP"), N-vinylcaprolactam, and N-vinylpiperidone.

In one embodiment of the present invention, polymer (B2) comprises a combination of at least two of the foregoing comonomers (β) in copolymerized form.

Preferred comonomers (β) are selected from those with a permanent cationic charge. Particularly preferred are the comonomers below.

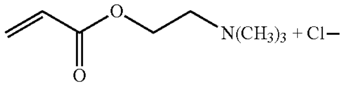

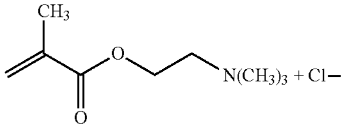

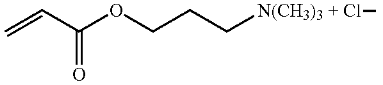

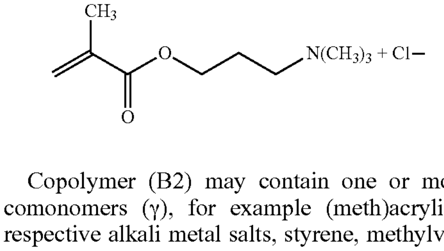

Copolymer (B2) may contain one or more additional comonomers (γ), for example (meth)acrylic acid or its respective alkali metal salts, styrene, methylvinylether, ethylvinyl ether, vinyl acetate, vinyl propionate, allyl acetate, vinyl n-butyrate, and vinyl 2-ethylhexanoate.

In one embodiment of the present invention, copolymer (B2) comprises comonomer(s) (α) and comonomer(s) (β) in a weight ratio in the range of from 50:1 to 1:4, preferably 10:1 to 1:3.5.

In embodiments of copolymer (B2) wherein one or more comonomers (γ) are present in copolymerized form, the weight ratio of (y)/[(a)+(β)] is in the range of from 1:1000 to 1:10.

Comonomers (α) and (β) may be arranged in polymer (B2) in any way, for example statistically, block-wise, or copolymer (B2) may be a graft copolymer. In a preferred embodiment, copolymers (B2) are random copolymers.

In one embodiment of the present invention, copolymer (B2) has an average molecular weight $M_w$ in the range of from 2,000 to 200,000 g/mole, preferably 3,000 to 175,000 g/mole and preferably 5,000 to 150,000 g/mole. The average molecular weight $M_w$ may be determined by SEC.

In one embodiment of the present invention, polymer (B) has a polydispersity $M_w/M_n$ in the range of from 1.1 to 5.0, preferably 1.3 to 4.0, even more preferred 1.5 to 3.5.

In one embodiment of the present invention, the weight ratio of chelating agent(s) (A) to polymer (B) is in the range of 100:1 to 1:10.

Preferably, the weight ratio of chelating agent(s) (A) to polyaspartate (B1) is in the range of 40:1 to 1:10, preferably 20:1 to 1:8, more preferably 10:1 to 1:5 and even more preferably 4:1 to 1:4.

Preferably, the weight ratio of chelating agent(s) (A) to copolymer (B2) is in the range of from 100:1 to 10:1, even more preferably from 75:1 to 20:1.

In one embodiment of the present invention, inventive powders and inventive granules comprise chelating agent (A) and polymer (B) in molecular disperse form. In the context of the present invention, the term "in molecularly disperse form" implies that all or a vast majority, for example at least 80% of the particles of inventive powder and of inventive granules contain chelating agent (A) and polymer (B). The term also implies that inventive powders and inventive granules are not simply particles of chelating agent (A) coated with polymer (B).

In one embodiment of the present invention, inventive powders are selected from powders having an average particle diameter (D50) in the range of from 5 μm to 100 μm, preferably from 5 μm to less than 0.1 mm.

In one embodiment of the present invention, inventive granules are selected from granules with an average particle diameter (D50) in the range of from 0.1 mm to 2 mm, preferably 250 μm to 1,250 μm, even more preferred are 350 to 900 μm.

In one embodiment of the present invention, inventive powder or inventive granule contains in the range of from 80 to 99% by weight chelating agent (A) and 1 to 20% by weight polymer (B), percentages referring to the solids content of said powder or granule.

In a preferred embodiment of the present invention, the term "in molecularly disperse form" also implies that essentially all particles of inventive powder or inventive granule contains in the range of from 80 to 99% by weight chelating agent (A) and 1 to 20% by weight polymer (B), percentages referring to the solids content of the respective powder or granule.

In one embodiment of the present invention, inventive granule or inventive powder comprises residual moisture, for example 1 to 20% by weight referring to the sum of chelating agent (A) and polymer (B), preferably 5 to 16% by weight. The contents of chelating agent in inventive granule—or inventive powder, as the case may be—may be determined by measuring the Fe binding capacity. The residual moisture content may be determined by Karl-Fischer titration or by drying at 160° C. to constant weight with infrared light.

Another aspect of the present invention relates to the use of inventive powders and inventive granules, and another aspect of the present invention relates to methods of use of the inventive powders and inventive granules. The preferred use of inventive powders and inventive granules is for the manufacture of solid laundry detergent compositions and of solid detergent compositions for hard surface cleaning. Solid laundry detergent compositions and solid detergent compositions for hard surface cleaning may contain some residual moisture, for example 0.1 to 10% by weight, but are otherwise solid mixtures. The residual moisture content may be determined, e.g., under vacuum at 80° C. Another aspect of the present invention relates to solid laundry detergent compositions and to solid detergent compositions for hard surface cleaning.

In the context of the present invention, the term "detergent composition for cleaners" includes cleaners for home care and for industrial or institutional applications. The term "detergent composition for hard surface cleaners" includes compositions for dishwashing, especially hand dishwash and automatic dishwashing and ware-washing, and compositions for other hard surface cleaning such as, but not limited to compositions for bathroom cleaning, kitchen cleaning, floor cleaning, descaling of pipes, window cleaning, car cleaning including truck cleaning, furthermore, open plant cleaning, cleaning-in-place, metal cleaning, disinfectant cleaning, farm cleaning, high pressure cleaning, but not laundry detergent compositions.

In the context of the present invention and unless expressly stated otherwise, percentages in the context of ingredients of laundry detergent compositions are percentages by weight and refer to the total solids content of the respective laundry detergent composition. In the context of the present invention and unless expressly stated otherwise, percentages in the context of ingredients of detergent composition for hard surface cleaning are percentages by weight and refer to the total solids content of the detergent composition for hard surface cleaner.

In one embodiment of the present invention, solid laundry detergent compositions according to the present invention may contain in the range of from 1 to 30% by weight of inventive powder or inventive granule, respectively. Percentages refer to the total solids content of the respective laundry detergent composition.

In one embodiment of the present invention, inventive solid detergent compositions for hard surface cleaning may contain in the range of from 1 to 50% by weight of inventive powder or inventive granule, respectively, preferably 5 to 40% by weight and even more preferably 10 to 25% by weight. Percentages refer to the total solids content of the respective detergent composition for hard surface cleaning.

Particularly advantageous inventive solid detergent compositions for hard surface cleaning and inventive solid laundry detergent compositions, especially for home care, may contain one or more complexing agent other than inventive powder and inventive granule. Inventive solid detergent compositions for hard surface cleaning and inventive solid laundry detergent compositions may contain one or more complexing agent (in the context of the present invention also referred to as sequestrant) other than an inventive powder or inventive granule. Examples are citrate, phosphonic acid derivatives, for example the disodium salt of hydroxyethane-1,1-diphosphonic acid ("HEDP"), and polymers with complexing groups like, for example, polyethylenimine in which 20 to 90 mole-% of the N-atoms bear at least one $CH_2COO^-$ group, and their respective alkali metal salts, especially their sodium salts, for example GLDA-$Na_4$, IDS-$Na_4$, and trisodium citrate, and phosphates such as STPP (sodium tripolyphosphate). Due to the fact that phosphates raise environmental concerns, it is preferred that advantageous detergent compositions for cleaners and advantageous laundry detergent compositions are free from phosphate. "Free from phosphate" should be understood in the context of the present invention, as meaning that the content of phosphate and polyphosphate is in sum in the range from 10 ppm to 0.2% by weight, determined by gravimetric methods.

Preferred inventive solid detergent compositions for hard surface cleaning and preferred inventive solid laundry detergent compositions may contain one or more surfactant, preferably one or more non-ionic surfactant.

For example, inventive compositions may comprise a surfactant other than inventive compound, a builder other than chelating agent (A), or a combination of the foregoing. Examples of such surfactants other than inventive compound are especially non-ionic surfactants.

Preferred non-ionic surfactants are alkoxylated alcohols, di- and multiblock copolymers of ethylene oxide and propylene oxide and reaction products of sorbitan with ethylene oxide or propylene oxide, alkyl polyglycosides (APG), hydroxyalkyl mixed ethers and amine oxides.

Preferred examples of alkoxylated alcohols and alkoxylated fatty alcohols are, for example, compounds of the general formula (III)

(III)

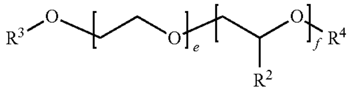

in which the variables are defined as follows:

$R^2$ is identical or different and selected from hydrogen and linear $C_1$-$C_{10}$-alkyl, preferably in each case identical and ethyl and particularly preferably hydrogen or methyl, $R^3$ is selected from $C_8$-$C_{22}$-alkyl, branched or linear, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$, $R^4$ is selected from $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl, The variables e and f are in the range from zero to 300, where the sum of e and f is at least one, preferably in the range of from 3 to 50. Preferably, e is in the range from 1 to 100 and f is in the range from 0 to 30.

In one embodiment, compounds of the general formula (III) may be block copolymers or random copolymers, preference being given to block copolymers.

Other preferred examples of alkoxylated alcohols are, for example, compounds of the general formula (IV)

(IV)

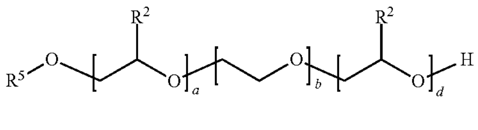

in which the variables are defined as follows:

$R^2$ is identical or different and selected from hydrogen and linear $C_1$-$C_4$-alkyl, preferably identical in each case and ethyl and particularly preferably hydrogen or methyl, $R^5$ is selected from $C_6$-$C_{20}$-alkyl, branched or linear, in particular n-$C_8H_{17}$, n-$C_{10}H_{21}$, n-$C_{12}H_{25}$, n-$C_{13}H_{27}$, n-$C_{15}H_{31}$, n-$C_{14}H_{29}$, n-$C_{16}H_{33}$, n-$C_{18}H_{37}$, a is a number in the range from zero to 10, preferably from 1 to 6, b is a number in the range from 1 to 80, preferably from 4 to 20, d is a number in the range from zero to 50, preferably 4 to 25.

The sum a+b+d is preferably in the range of from 5 to 100, even more preferably in the range of from 9 to 50.

Preferred examples for hydroxyalkyl mixed ethers are compounds of the general formula (V)

(V)

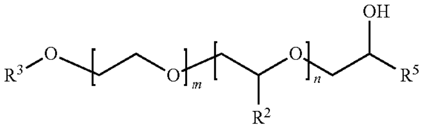

in which the variables are defined as follows:

$R^2$ is identical or different and selected from hydrogen and linear $C_1$-$C_{10}$-alkyl, preferably in each case identical and ethyl and particularly preferably hydrogen or methyl, $R^3$ is selected from $C_8$-$C_{22}$-alkyl, branched or linear, for example iso-$C_{11}H_{23}$, iso-$C_{13}H_{27}$, n-$C_8H_{17}$, n-$C_{10}H_{21}$, n-$C_{12}H_{25}$, n-$C_{14}H_{29}$, n-$C_{16}H_{33}$ or n-$C_{18}H_{37}$, $R^5$ is selected from $C_6$-$C_{20}$-alkyl, for example n-hexyl, isohexyl, sec-hexyl, n-heptyl, n-octyl, 2-ethylhexyl, n-nonyl, n-decyl, isodecyl, n-dodecyl, n-tetradecyl, n-hexadecyl, and noctadecyl.

The variables m and n are in the range from zero to 300, where the sum of n and m is at least one, preferably in the range of from 5 to 50. Preferably, m is in the range from 1 to 100 and n is in the range from 0 to 30.

Compounds of the general formula (IV) and (V) may be block copolymers or random copolymers, preference being given to block copolymers.

Further suitable nonionic surfactants are selected from di- and multiblock copolymers, composed of ethylene oxide and propylene oxide. Further suitable nonionic surfactants are selected from ethoxylated or propoxylated sorbitan esters. Amine oxides or alkyl polyglycosides, especially linear $C_4$-$C_{16}$-alkyl polyglycosides and branched $C_8$-$C_{14}$-alkyl polyglycosides such as compounds of general average formula (VI) are likewise suitable.

(VI)

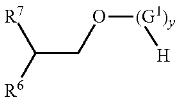

wherein:

$R^6$ is $C_1$-$C_4$-alkyl, in particular ethyl, n-propyl or isopropyl, $R^7$ is $-(CH_2)_2-R^6$, $G^1$ is selected from monosaccharides with 4 to 6 carbon atoms, especially from glucose and xylose, y in the range of from 1.1 to 4, y being an average number, Further examples of non-ionic surfactants are compounds of general formula (VII) and (VIII)

(VII)

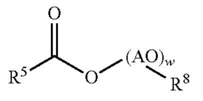

(VIII)

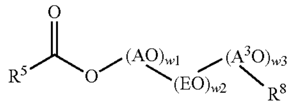

AO is selected from ethylene oxide, propylene oxide and butylene oxide,

EO is ethylene oxide, $CH_2CH_2$—O, $R^8$ selected from $C_8$-$C_{18}$-alkyl, branched or linear, and $R^5$ is defined as above.

$A^3O$ is selected from propylene oxide and butylene oxide, w is a number in the range of from 15 to 70, preferably 30 to 50, w1 and w3 are numbers in the range of from 1 to 5, and w2 is a number in the range of from 13 to 35.

An overview of suitable further nonionic surfactants can be found in EP-A 0 851 023 and in DE-A 198 19 187.

Mixtures of two or more different nonionic surfactants selected from the foregoing may also be present.

Other surfactants that may be present are selected from amphoteric (zwitterionic) surfactants and anionic surfactants and mixtures thereof.

Examples of amphoteric surfactants are those that bear a positive and a negative charge in the same molecule under use conditions. Preferred examples of amphoteric surfactants are so-called betaine-surfactants. Many examples of betaine-surfactants bear one quaternized nitrogen atom and one carboxylic acid group per molecule. A particularly preferred example of amphoteric surfactants is cocamidopropyl betaine (lauramidopropyl betaine).

Examples of amine oxide surfactants are compounds of the general formula (IX)

$$R^9R^{10}R^{11}N \rightarrow O \qquad (IX)$$

wherein $R^9$, $R^{10}$, and $R^{11}$ are selected independently from each other from aliphatic, cycloaliphatic or $C_2$-$C_4$-alkylene $C_{10}$-$C_{20}$-alkylamido moieties. Preferably, $R^9$ is selected from $C_8$-$C_{20}$-alkyl or $C_2$-$C_4$-alkylene $C_{10}$-$C_{20}$-alkylamido and $R^{10}$ and $R^{11}$ are both methyl.

A particularly preferred example is lauryl dimethyl aminoxide, sometimes also called lauramine oxide. A further particularly preferred example is cocamidylpropyl dimethylaminoxide, sometimes also called cocamidopropylamine oxide.

Examples of suitable anionic surfactants are alkali metal and ammonium salts of $C_8$-$C_{18}$-alkyl sulfates, of $C_8$-$C_{18}$-fatty alcohol polyether sulfates, of sulfuric acid half-esters of ethoxylated $C_4$-$C_{12}$-alkylphenols (ethoxylation: 1 to 50 mol of ethylene oxide/mol), $C_{12}$-$C_{18}$ sulfo fatty acid alkyl esters, for example of $C_{12}$-$C_{18}$ sulfo fatty acid methyl esters, furthermore of $C_{12}$-$C_{18}$-alkylsulfonic acids and of $C_{10}$-$C_{18}$-alkylarylsulfonic acids. Preference is given to the alkali metal salts of the aforementioned compounds, particularly preferably the sodium salts.

Further examples for suitable anionic surfactants are soaps, for example the sodium or potassium salts of stearic acid, oleic acid, palmitic acid, ether carboxylates, and alkylether phosphates.

In one embodiment of the present invention, inventive compositions may contain 0.1 to 60% by weight of at least one surfactant, selected from anionic surfactants, amphoteric surfactants and amine oxide surfactants.

In a preferred embodiment, inventive compositions do not contain any anionic surfactant.

Inventive compositions may contain at least one bleaching agent, also referred to as bleach. Bleaching agents may be selected from chlorine bleach and peroxide bleach, and peroxide bleach may be selected from inorganic peroxide bleach and organic peroxide bleach. Preferred are inorganic peroxide bleaches, selected from alkali metal percarbonate, alkali metal perborate and alkali metal persulfate.

Examples of organic peroxide bleaches are organic percarboxylic acids, especially organic percarboxylic acids.

In inventive compositions, alkali metal percarbonates, especially sodium percarbonates, are preferably used in coated form. Such coatings may be of organic or inorganic nature. Examples are glycerol, sodium sulfate, silicate, sodium carbonate, and combinations of at least two of the foregoing, for example combinations of sodium carbonate and sodium sulfate.

Suitable chlorine-containing bleaches are, for example, 1,3-dichloro-5,5-dimethylhydantoin, N-chlorosulfamide, chloramine T, chloramine B, sodium hypochlorite, calcium hypochlorite, magnesium hypochlorite, potassium hypochlorite, potassium dichloroisocyanurate and sodium dichloroisocyanurate.

Inventive compositions may comprise, for example, in the range from 3 to 10% by weight of chlorine-containing bleach.

Inventive compositions may comprise one or more bleach catalysts. Bleach catalysts can be selected from bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Inventive compositions may comprise one or more bleach activators, for example N-methylmorpholinium-acetonitrile salts ("MMA salts"), trimethylammonium acetonitrile salts, N-acylimides such as, for example, N-nonanoylsuccinimide, 1,5-diacetyl-2,2-dioxohexahydro-1,3,5-triazine ("DADHT") or nitrile quats (trimethylammonium acetonitrile salts).

Further examples of suitable bleach activators are tetraacetylethylenediamine (TAED) and tetraacetylhexylenediamine.

Inventive compositions may comprise one or more corrosion inhibitors. In the present case, this is to be understood as including those compounds that inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol.

In one embodiment of the present invention, inventive compositions comprise in total in the range from 0.1 to 1.5% by weight of corrosion inhibitor.

Inventive compositions may comprise one or more builders, selected from organic and inorganic builders. Examples of suitable inorganic builders are sodium sulfate or sodium carbonate or silicates, in particular sodium disilicate and sodium metasilicate, zeolites, sheet silicates, in particular those of the formula $\alpha$-$Na_2Si_2O_5$, $\beta$-$Na_2Si_2O_5$, and δ-$Na_2Si_2O_5$, also fatty acid sulfonates, α-hydroxypropionic acid, alkali metal malonates, fatty acid sulfonates, alkyl and alkenyl disuccinates, tartaric acid diacetate, tartaric acid monoacetate, oxidized starch, and polymeric builders, for example polycarboxylates and polyaspartic acid.

Examples of organic builders are especially polymers and copolymers. In one embodiment of the present invention, organic builders are selected from polycarboxylates, for example alkali metal salts of (meth)acrylic acid homopolymers or (meth)acrylic acid copolymers.

Suitable comonomers are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_w$ in the range from 2000 to 40 000 g/mol, preferably 2000 to 10 000 g/mol, in particular 3000 to 8000 g/mol. Also of suitability are copolymeric polycarboxylates, in particular those of acrylic acid with methacrylic acid and of acrylic acid or methacrylic acid with maleic acid and/or fumaric acid, and in the same range of molecular weight.

It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilic or hydrophobic monomer as listed below.

Suitable hydrophobic monomers are, for example, isobutene, diisobutene, butene, pentene, hexene and styrene, olefins with 10 or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-α-olefin, a mixture of $C_{20}$-$C_{24}$-α-olefins and polyisobutene having on average 12 to 100 carbon atoms per molecule.

Suitable hydrophilic monomers are monomers with sulfonate or phosphonate groups, and also nonionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth) acrylate. Polyalkylene glycols here may comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of said acids, such as sodium, potassium or ammonium salts thereof.

Particularly preferred phosphonate-group-containing monomers are vinylphosphonic acid and its salts.

A further example of builders is carboxymethyl inulin.

Moreover, amphoteric polymers can also be used as builders.

Inventive compositions may comprise, for example, in the range from in total 10 to 70% by weight, preferably up to 50% by weight, of builder. In the context of the present invention, chelating agent (B) is not counted as builder.

In one embodiment of the present invention, inventive compositions may comprise one or more cobuilders.

Inventive compositions may comprise one or more antifoams, selected for example from silicone oils and paraffin oils.

In one embodiment of the present invention, inventive compositions comprise in total in the range from 0.05 to 0.5% by weight of antifoam.

Inventive compositions may comprise one or more enzymes. Examples of enzymes are lipases, hydrolases, amylases, proteases, cellulases, esterases, pectinases, lactases and peroxidases.

In one embodiment of the present invention, inventive compositions may comprise, for example, up to 5% by weight of enzyme, preference being given to 0.1 to 3% by weight. Said enzyme may be stabilized, for example with the sodium salt of at least one $C_1$-$C_3$-carboxylic acid or 04-$C_{10}$-dicarboxylic acid. Preferred are formates, acetates, adipates, and succinates.

In one embodiment of the present invention, inventive compositions, especially when used as automatic dishwashing detergents, may comprise at least one zinc salt. Zinc salts may be selected from water-soluble and water-insoluble zinc salts. In this connection, within the context of the present invention, water-insoluble is used to refer to those zinc salts which, in distilled water at 25° C., have a solubility of 0.1 g/l or less. Zinc salts which have a higher solubility in water are accordingly referred to within the context of the present invention as water-soluble zinc salts.

In one embodiment of the present invention, zinc salt is selected from zinc benzoate, zinc gluconate, zinc lactate, zinc formate, $ZnCl_2$, $ZnSO_4$, zinc acetate, zinc citrate, $Zn(NO_3)_2$, $Zn(CH_3SO_3)_2$ and zinc gallate, preferably $ZnCl_2$, $ZnSO_4$, zinc acetate, zinc citrate, $Zn(NO_3)_2$, $Zn(CH_3SO_3)_2$ and zinc gallate.

In another embodiment of the present invention, zinc salt is selected from ZnO, ZnO.aq, $Zn(OH)_2$ and $ZnCO_3$. Preference is given to ZnO.aq.

In one embodiment of the present invention, zinc salt is selected from zinc oxides with an average particle diameter (weight-average) in the range from 10 nm to 100 μm.

The cation in zinc salt can be present in complexed form, for example complexed with ammonia ligands or water ligands, and in particular be present in hydrated form. To simplify the notation, within the context of the present invention, ligands are generally omitted if they are water ligands.

Depending on how the pH of mixture according to the invention is adjusted, zinc salt can change. Thus, it is for example possible to use zinc acetate or $ZnCl_2$ for preparing formulation according to the invention, but this converts at a pH of 8 or 9 in an aqueous environment to ZnO, $Zn(OH)_2$ or ZnO.aq, which can be present in non-complexed or in complexed form.

Zinc salt may be present in those inventive automatic dishwashing formulations which are solid at room temperature are preferably present in the form of particles which have for example an average diameter (number-average) in the range from 10 nm to 100 μm, preferably 100 nm to 5 μm, determined for example by X-ray scattering.

Zinc salt may be present in those detergent compositions for home care applications that are liquid at room temperature in dissolved or in solid or in colloidal form.

In one embodiment of the present invention, inventive automatic dishwashing formulations comprise in total in the range from 0.05 to 0.4% by weight of zinc salt, based in each case on the solids content of the composition in question.

Here, the fraction of zinc salt is given as zinc or zinc ions. From this, it is possible to calculate the counterion fraction.

In one embodiment of the present invention, inventive automatic dishwashing formulation contain polyalkylenimine, for example polypropylenimine or polyethylenimine. Polyalkylenimine may be substituted, for example with $CH_2COOH$ groups or with polyalkylenoxide chains, or non-substituted. In one embodiment of the present invention, 60 to 80 mole-% of the primary and secondary amine functions of polyalkylenimines are substituted with $CH_2COOH$ groups or with ethylene oxide or propylene oxide. Particularly preferred are non-substituted polyethylenimine with an average molecular weight $M_w$ in a range of from 500 to 20,000 g/mol, determined advantageously by gel permeation chromatography (GPC) in 1.5% by weight aqueous formic acid as eluent and cross-linked poly-hydroxyethylmethacrylate as stationary phase. In other embodiments, polyethoxylated polyethylenimines are preferred, with an average molecular weight $M_w$ in a range of from 2,500 to 50,000 g/mol, determined advantageously by gel permeation chromatography (GPC) in 1.5% by weight aqueous formic acid as eluent and cross-linked poly-hydroxyethylmethacrylate as stationary phase. In other embodiments, polyethoxylated polypropylenimines are preferred, with an average molecular weight $M_w$ in a range of from 2,500 to 50,000 g/mol, determined advantageously by gel permeation chromatography (GPC) in 1.5% by weight aqueous formic acid as eluent and cross-linked poly-hydroxyethylmethacrylate as stationary phase.

Polyethylenimines and polypropylenimines, non-substituted or substituted as above, may applied in small amounts, for example 0.01 to 2% by weight, referring to the total solids content of the respective inventive automatic dishwashing formulation.

In one embodiment of the present invention, inventive compositions are free from heavy metals apart from zinc compounds. Within the context of the present, this may be understood as meaning that inventive compositions are free from those heavy metal compounds which do not act as bleach catalysts, in particular of compounds of iron and of bismuth. Within the context of the present invention, "free from" in connection with heavy metal compounds is to be understood as meaning that the content of heavy metal compounds that do not act as bleach catalysts is in sum in the range from 0 to 100 ppm, determined by the leach method and based on the solids content. Preferably, detergent compositions according to the invention has, apart from zinc, a heavy metal content below 0.05 ppm, based on the solids content of the formulation in question. The fraction of zinc is thus not included.

Within the context of the present invention, "heavy metals" are defined to be any metal with a specific density of at least 6 $g/cm^3$ with the exception of zinc. In particular, the heavy metals are metals such as bismuth, iron, copper, lead, tin, nickel, cadmium and chromium.

Preferably, inventive automatic dishwashing formulations comprise no measurable fractions of bismuth compounds, i.e. for example less than 1 ppm.

In one embodiment of the present invention, inventive compositions comprise one or more further ingredient such as fragrances, dyestuffs, organic solvents, buffers, disintegrants for tabs, and/or acids such as methylsulfonic acid.

Inventive compositions are excellent in rinsing, especially when used as automatic dishwashing compositions.

The invention is further illustrated by working examples.

General remarks: $Nm^3$: norm cubic meter, cubic meter under normal conditions (20° C., 1 atm)

I. SYNTHESES OF COMPONENTS

A 5-litre stirred flask was charged with 1,170 g of de-ionized water and heated to 40° C. 668.5 g of L-alanine (99.2 wt-% representing 7.44 mol with >98% ee) were added. To the resultant slurry 390.0 g of 50% by weight aqueous sodium hydroxide solution (4.88 mol) were added over a period of 30 minutes. During the addition the temperature raised to 60° C. After complete addition of the sodium hydroxide the slurry was stirred at 60° C. for 30 minutes. A clear solution was obtained.

At 38 to 42° C. the above solution, 14.73 moles of formaldehyde as 30% aqueous solution, and 12.02 moles of HCN (80% of total amount) were added to the first stirred tank reactor in a cascade comprising three stirred tank reactors. In the second stirred reactor additional 3.00 moles of HCN (20% of total amount) was added at 38-42° C. In the third stirred reactor at 38 to 42° C., the reaction was completed. An aqueous solution of partially neutralized L-alanine N,N-bis acetonitrile was obtained. It was used as feed for the saponification.

The first part of the saponification was conducted in a cascade of two stirred tank reactors and a tubular reactor. The temperature was approximately 55° C. in all three reactors.

In a first stirred reactor, the feed solution as provided above and NaOH as 50% aqueous solution were added. For completion of the reaction, the mixture was further reacted in a second stirred tank reactor and in a tubular reactor. The solution obtained under steady state conditions was used as feed in the hot saponification.

The hot saponification was performed at 180° C. and 24 bar in a tubular plug flow reactor at 30 to 45 min retention time.

The solution obtained under steady state conditions was expanded to ambient pressure and stirred in a tank reactor at 970 mbar at 94 to 98° C. in order to remove ammonia. Then it was stripped in a wiped film evaporator at 900 mbar at 100° C. to further remove ammonia. Then, the concentration of total MGDA-$Na_{2.91}$ (A.1) was adjusted to approximately 40% by weight (based on iron binding capacity).

I.2 Synthesis of Copolymer (B2.1)

Feed 1: 69.1 g (0.51 mole) 2-hydroxyethyl methacrylate (α-1)

Feed 2: 402 g (0.91 mole) 50% by weight aqueous solution of (3-methacrylamidopropyl) trimethylammonium chloride (β.1-1) ("MAPTAC")

Feed 3: 112 g of an aqueous 5% by weight solution of 2,2'-azobis (2-methylpropionamidine)

A 2-l flask was charged with 300 ml water under an atmosphere of $N_2$. The water was heated to 80° C. under stirring. When a temperature of 80° C. was reached, 4 ml of Feed 1 were added. Then, simultaneous addition of Feed 1, Feed 2, and Feed 3 was started. Feeds 1 and 2 were added within 120 minutes and Feed 3 was added within 150 minutes under continuous stirring at 80° C. Stirring at 80° C. was continued for another 30 minutes. Then, 28 ml of an aqueous 5% by weight solution of 2,2'-azobis (2-methylpropionamidine) were added within 15 minutes, and stirring at 80° C. was continued for another 120 minutes. Then, the resultant mixture was cooled to 40° C. and filtered over a 230 μm mesh filter. A slightly turbid yellowish solution of copolymer (B2.1) was obtained, pH value: 4.4, solids content 30.4%, and K value (Fikentscher) 52.8, determined in a 1% by weight aqueous solution.

II. SPRAY GRANULATION

The spray granulations were carried out in a lab granulator (Glatt LabSystem with Vario 3 insert attached with a zig-zag air classifier).

II.1 Inventive Spray Granulation

II.1.1 Manufacture of Spray Solution SL.1

A vessel was charged with 14.63 kg of a 40% by weight aqueous solution of (A.1) and 507 g of an aqueous solution of copolymer (B2.1). The solution SL.1 so obtained was stirred, heated to 50° C. and then subjected to spray granulation.

II.1.2 Spray Granulation of Spray Solution SL.1

The granulator was charged with 0.9 kg of solid MGDA-$Na_3$ particles (residual moisture: 12%) and 600 g of milled granules of MGDA-$Na_3$. The granules were milled down using a hammer mill (Kinetatica Polymix PX-MFL 90D) at 4000 rpm (rounds per minute), 2 mm mesh. The solid MGDA-$Na_3$ was fluidized by introducing of 200 $Nm^3$/h of air with a temperature of 165 to 170° C. into the granulator from the bottom. SL.1 was introduced by spraying 6.2 kg/h of SL.1 (temperature of the solution: 50° C.) into the fluidized bed from the bottom through a two-fluid nozzle (parameters: absolute pressure of the atomizing air: 5 bar). Granules were formed, and the bed temperature, which corresponds to the surface temperature of the solids in the fluidized bed, was 95 to 100° C.

Continuously, particles large (heavy) enough fall through the zigzag air classifier operated at 2 bar relative pressure into a sample bottle. The smaller (lighter) granules were blown through the recycle back into the fluidized bed by the air classifier.

When about 1 liter of granules were collected in the sample bottle, the bottle was replaced by a new sample bottle. The collected granules were subjected to a sieving step. The mesh size of the sieve is 1 mm. Two fractions were obtained: coarse particles (diameter>1 mm) and value fraction (<1 mm). Coarse particles (diameter>1 mm), were milled down together with small amounts of value fraction using a hammer mill (Kinetatica Polymix PX-MFL 90D) at 4000 rpm (rounds per minute), 2 mm mesh. The powder so obtained was returned into the fluidized bed. The major part of the value fraction, which was not milled down, left the process and was collected. After having sprayed 10 kg of SL.1 a steady state was reached. Then, the fraction<1 mm was collected as inventive granule Gr.1.

In the above example, hot air may be replaced by hot nitrogen having the same temperature.

II.2 Comparative Example: Manufacture of Comparative Granules

II.2.1 Manufacture of Comparative Spray Solution C-SL.2

A vessel was charged with 14.63 kg of a 40% by weight aqueous solution of MGDA-$Na_3$ and 507 g of a 30% by weight aqueous solution of copolymer (B2.1). The solution C-SL.2 so obtained was stirred, heated to 50° C. and then subjected to spray granulation.

II.2.2 Spray Granulation of the Comparative Spray Solution C-SL.2

The granulator was charged with 1.5 kg of solid granules that had remained in the granulator at the end of the granulation of example II.1.2. The solid MGDA-$Na_3$ was fluidized by introducing of 200 $Nm^3$/h of air with a temperature of 165 to 170° C. into the granulator from the bottom. The above-mentioned solution SL.2 was introduced by spraying 6.3 kg of SL.2 (temperature of the solution: 50° C.) per hour into the fluidized bed from the bottom through a two-fluid nozzle (parameters: absolute pressure of the atomizing air: 5 bar).

After the start of the granulation process, the protocol of example 11.1.2 was essentially followed but using solution C-SL.2. Comparative granule Gr.2 was obtained.

III. MANUFACTURE OF DISHWASHING FORMULATIONS

Preferred example automatic dishwashing formulations may be selected according to Table 1.

TABLE 1

Example compositions for automatic dishwashing

| All amounts in g/sample | ADW.1 | ADW.2 | ADW.3 |
|---|---|---|---|
| inventive granule Gr.1 | 30 | 22.5 | 15 |
| Protease | 2.5 | 2.5 | 2.5 |
| Amylase | 1 | 1 | 1 |
| Sodium percarbonate | 10.5 | 10.5 | 10.5 |
| TAED | 4 | 4 | 4 |
| $Na_2Si_2O_5$ | 2 | 2 | 2 |
| $Na_2CO_3$ | 19.5 | 19.5 | 19.5 |
| trisodium citrate dihydrate | 15 | 22.5 | 30 |
| HEDP | 0.5 | 0.5 | 0.5 |
| n-$C_{18}H_{37}$—$O(CH_2CH_2O)_9H$ | 5 | 5 | 5 |

Comparative automatic dishwashing formulations may be made by replacing inventive granule Gr.1 by c-Gr.2. Such comparative automatic dishwashing formulations perform less god as inventive automatic dishwashing compositions.

IV. FURTHER EXPERIMENTS

Two 100 g solutions containing 40% active ingredient of MGDA and 2.5% (B2.1) active ingredient polymer were made.

Test solution 1 was manufactured by mixing Gr.1 g (84.4% active ingredient), 8.31 g copolymer (B2.1), (30% active ingredient) and 44.3 g water. The pH value of test solution 1 was 10.

Test solution 2 was manufactured by mixing 49.63 g c-Gr.2 (80.6% active ingredient), 16.61 g copolymer (B2.1), 30% active ingredient, and 35.48 ml water. The pH value of test solution 2 was 13.

Both test solutions were stirred for 3 hours at 50° C. followed by stirring for 1 hour at 80° C. and 36 hours at 22° C. IR analysis of the test solutions showed differences in the finger print zone that may be assigned hydrolysis of the ester bond in (B2.1).

The invention claimed is:

1. A process for manufacturing a granule or powder, said process comprising:

(a) providing an aqueous solution or slurry comprising:

(A) a chelating agent having formula (I a) or formuala (I b):

$$[CH_3\text{—}CH(COO)\text{—}N(CH_2\text{—}COO)_2]M_{3-x}H_x \quad \text{(I a)}$$

$$[OOC\text{—}CH_2CH_2\text{—}CH(COO)\text{—}N(CH_2\text{—}COO)_2]M_{4-x}H_x \quad \text{(I b)},$$

wherein M is selected from the group consisting of an alkali metal cation and ammonium, and x is in a range of from 0.01 to 1.0 in formula (I a) and in a range of from 0.01 to 2.0 in formula (I b), and (B) a polymer selected from the group consisting of:

(B1) a polyaspartate having an average molecular weight $M_w$ in a range of from 1,000 to 20,000 g/mole, and (B2) a copolymer comprising, in copolymerized form:

(α) an ester of an ethylenically unsaturated mono- or dicarboxylic acid, and (β) an ethylenically unsaturated N-containing monomer; and (b) spray drying or granulating said aqueous solution or slurry.

2. The process of claim 1, wherein said aqueous slurry or solution provided in (a) has a concentration of the chelating agent (A) in a range of from 30 to 65% by weight.

3. The process of claim 1, wherein (b) is performed in a fluidized bed or spouted bed.

4. The process of claim 1, wherein, in (b), a gas inlet temperature is at least 120° C.

5. The process of claim 1, wherein the aqueous slurry or solution provided in (a) has a weight ratio of the chelating agent (A) to the polymer (B) in a range of from 100:1 to 1:10.

6. The process of claim 1, which is at least partially performed in a fluidized bed comprising particles having an average diameter (D50) in a range of from 100 to 800 μm.

7. The process of claim 1, wherein the aqueous slurry is provided in (a), subjected to spray-granulation in (b), and further comprises an additive selected from the group consisting of a silica, a silicate, and an organic (co)polymer other than the polymer (B).

8. The process of claim 1, wherein the average molecular weight $M_w$ of the copolymer (B2) is in a range of from 2,000 to 200,000 g/mole.

* * * * *